(12) United States Patent
Kumar et al.

(10) Patent No.: US 11,768,738 B2
(45) Date of Patent: Sep. 26, 2023

(54) INTELLIGENT FAILSAFE ENGINE

(71) Applicant: Bank of America Corporation, Charlotte, NC (US)

(72) Inventors: Ashok Kumar, Hyderabad (IN); Narsing Raj, Hyderabad (IN); Gaddam Sunil Reddy, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 217 days.

(21) Appl. No.: 17/245,200

(22) Filed: Apr. 30, 2021

(65) Prior Publication Data

US 2022/0350709 A1    Nov. 3, 2022

(51) Int. Cl.
*G06F 11/14* (2006.01)
*G06N 20/00* (2019.01)

(52) U.S. Cl.
CPC ...... *G06F 11/1451* (2013.01); *G06F 2201/80* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,713,123 B2 | 7/2020 | Yu et al. | |
| 10,719,410 B2 | 7/2020 | Bronk | |
| 10,725,508 B2 | 7/2020 | Brown et al. | |
| 10,776,394 B2 | 9/2020 | Krojzl et al. | |
| 10,817,383 B2 | 10/2020 | Ke et al. | |
| 10,824,514 B2 | 11/2020 | Abdul Kadar et al. | |
| 10,838,651 B2 | 11/2020 | Lin et al. | |
| 10,860,432 B2 | 12/2020 | Wolfe | |
| 10,860,441 B2 | 12/2020 | Dai et al. | |
| 10,877,855 B2 | 12/2020 | Sun et al. | |
| 10,878,084 B1 | 12/2020 | Voss et al. | |
| 10,901,855 B2 | 1/2021 | Jarvie et al. | |
| 10,922,192 B2 | 2/2021 | Liu et al. | |
| 10,922,193 B2 | 2/2021 | Ma | |
| 10,956,270 B2 | 3/2021 | Redko et al. | |
| 10,956,277 B2 | 3/2021 | Formato et al. | |
| 10,956,280 B2 | 3/2021 | Ma | |
| 10,963,181 B2 | 3/2021 | Chan | |
| 10,983,718 B2 | 4/2021 | Wang et al. | |
| 10,983,871 B2 | 4/2021 | Calder et al. | |
| 2006/0235907 A1 * | 10/2006 | Kathuria | G06F 11/1461 |

(Continued)

*Primary Examiner* — Belix M Ortiz Ditren
(74) *Attorney, Agent, or Firm* — Banner & Witcoff, Ltd.

(57) ABSTRACT

Aspects of the disclosure relate to an intelligent failsafe engine. A computing platform may determine that a backup should be initiated that corresponds to a determined time window. The computing platform may select either a full backup method or a differential backup method. The computing platform may initiate the selected backup method, which may include backing up only blocks that have been modified since a previous backup. The computing platform may identify that the backup has paused at a particular data block. The computing platform may identify that the backup may be resumed, and may resume the backup at the particular data block. The computing platform may send data health information and commands directing a user device to display the data health information, which may cause the user device to display the data health information.

20 Claims, 8 Drawing Sheets

(56) References Cited

U.S. PATENT DOCUMENTS

2009/0300633 A1* 12/2009 Altrichter ............. G06F 9/4856
                                                    711/E12.001
2009/0307283 A1* 12/2009 Lehr ................... G06F 11/1461
2021/0038141 A1*  2/2021 Yun .......................... H02J 7/00

* cited by examiner

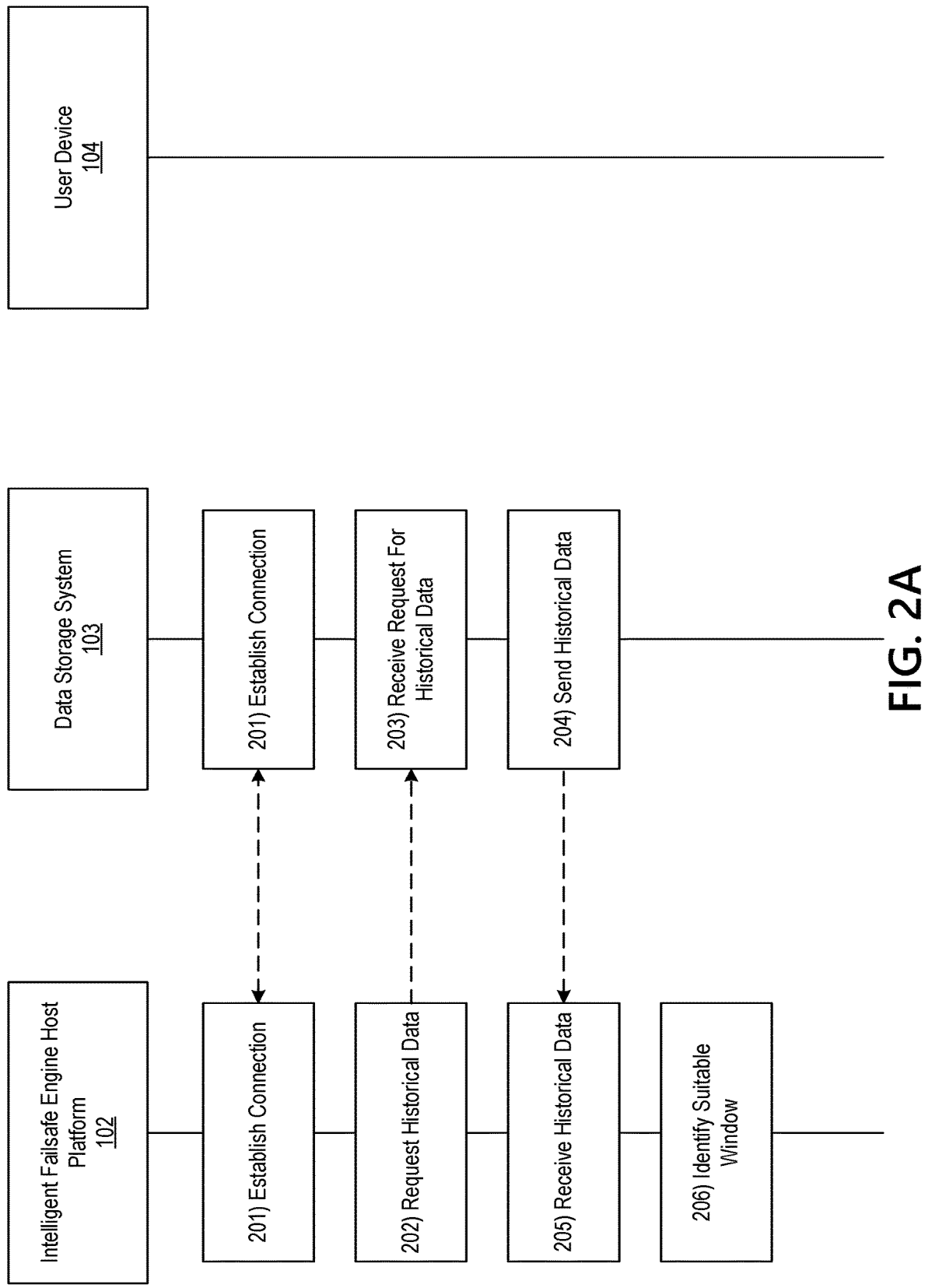

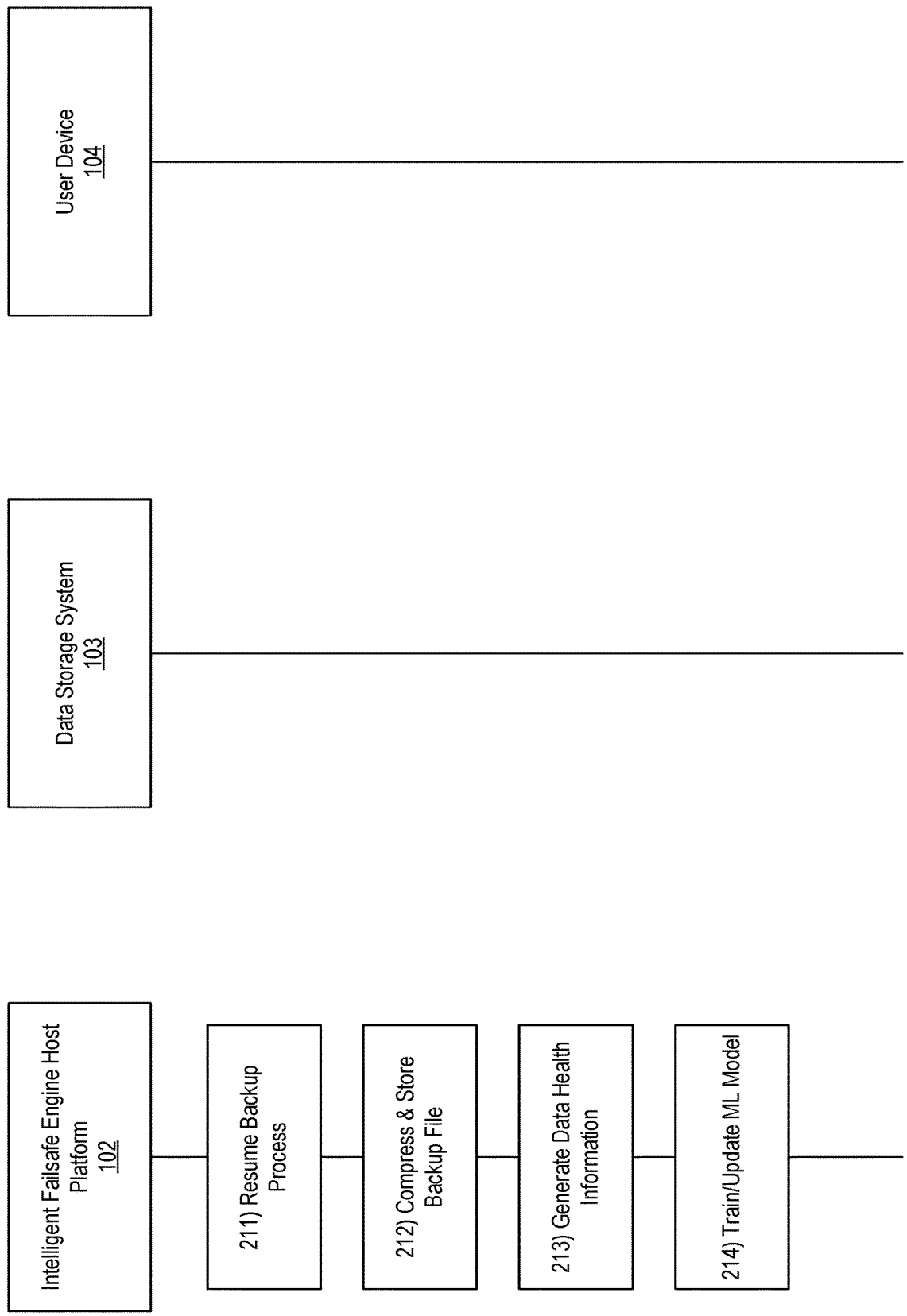

INTELLIGENT FAILSAFE ENGINE

BACKGROUND

Aspects of the disclosure relate to database backup methods. In particular, one or more aspects of the disclosure relate to providing improved database backup methods using intelligent failsafe methods.

In some instances, enterprise organizations and/or individuals may initiate, create, and/or use database backups. In some instances, however, these backups may be unsuccessful and/or inefficient. In these instances, business continuity and/or performance may be adversely impacted. Accordingly, it may be important to improve such backup methods, particularly in a way that does not unduly burden computing resources and/or network bandwidth.

SUMMARY

Aspects of the disclosure provide effective, efficient, scalable, and convenient technical solutions that address and overcome the technical problems associated with data backup processes. In accordance with one or more embodiments of the disclosure, a computing platform comprising at least one processor, a communication interface, and memory storing computer-readable instructions may identify, using historical data and one or more machine learning algorithms, a time window during which to perform a database backup. The computing platform may determine that a backup should be initiated that corresponds to the time window. The computing platform may select a backup method from one of: a full backup or a differential backup. The computing platform may initiate the selected backup method, which may include backing up only blocks that have been modified since a previous backup. The computing platform may identify that the backup has paused at a particular data block. The computing platform may identify that the backup may be resumed. The computing platform may resume the backup at the particular data block. The computing platform may send data health information and one or more commands directing a user device to display the data health information, which may cause the user device to display the data health information.

In one or more instances, selecting the backup method may comprise selecting, based on the historical data, the backup method. In one or more instances, performing the full backup may comprise backing up a plurality of data blocks, and performing the full backup may comprise backing up only blocks in the plurality of data blocks that have been modified since a previous backup of the plurality of data blocks.

In one or more instances, performing the differential backup may include backing up a first subset of the plurality of data blocks during a first interval of the time window and backing up a second subset of the plurality of data blocks during a second interval of the time window, different than the first interval. In one or more instances, performing the differential backup may include backing up only blocks in the plurality of data blocks that have been modified since the previous backup of the plurality of data blocks.

In one or more instances, the computing platform may complete the backup method, which may result in backup information. The computing platform may compress the backup information, and store the compressed backup information.

In one or more instances, the data health information may indicate the particular data block. In one or more instances, the computing platform may be a cloud based system. In one or more instances, update, using the data health information, the one or more machine learning algorithms.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for an intelligent failsafe engine in accordance with one or more example embodiments;

DETAILED DESCRIPTION

Figure 1A:
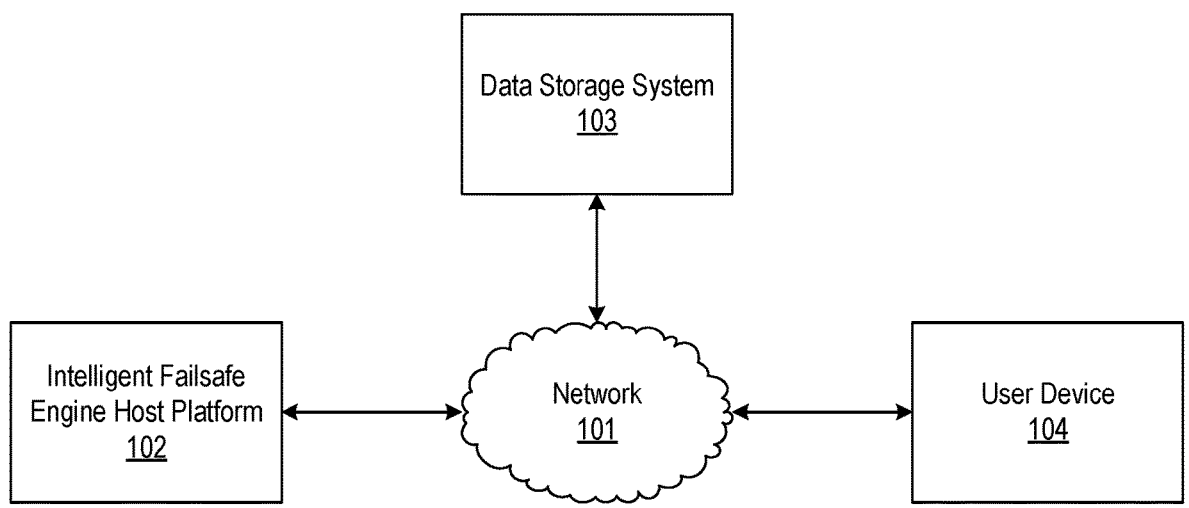
FIGS. 1A-1B depict an illustrative computing environment for an intelligent failsafe engine in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure are directed to an intelligent failsafe engine.

More specifically, business continuity may be extremely crucial for every organization, and it may depend on two factors, recovery time objective (RTO) and recovery point objective (RPO). Organizations may want minimal RTO and RPO, and the best way to accomplish this goal may be through a backup and disaster recovery (BDR) solution. Irrespective, current BDR solutions may be static and may have challenges that eventually increase RTO and/or RPO.

Irrespective of technology, backup may run on a predefined schedule, and whether data is changed or not, backup may happen at its predefined schedule. This may bring challenges in modern dynamic business models such as: 1) backup failures and slow backups, 2) inappropriate backups type, 3) increased RTO and RPO, 4) adverse impacts on business performance, 5) input/output freezes due to heavy data load may result in a down server, and/or 6) increased maintenance windows.

Accordingly, described herein is a unique system and associated logic that facilitates the system to learn and decide on the best suitable backups, restorations, and/or suitable windows for backups and backup types. This may be a graphical user interface based tool run on a central server, and may have a dashboard to deploy this failsafe solution to registered database servers. In some instances, parallel backups and dynamic compressions may be implemented, and network failures during backup and restore may be performed.

This may result in key benefits such as: 1) no human may be needed to manage the BDR solutions, 2) backup may be performed only of modified blocks, which may facilitate faster backups, 3) restoration may be performed only of modified blocks, which may facilitate faster backups, 4) improved RTO and RPO service level agreement (SLA) and mean time to recovery/restore (MTTR) in business restore, 5) determination of a suitable backup window/dynamic compression, 6) reduced maintenance windows, which may give more time to business processes, 7) improved system performance, which may conserve computing cycles and storage, and/or 8) issues may be viewable in a dashboard, including alerts and reports.

Accordingly, described herein are features such as: 1) facilitating the system to decide on a best appropriate backup type, and whether to perform a backup at all, 2) the system may decide on a best suitable dynamic window for backups, 3) backup may be paused based on system health, change-lists may be updated, and backup may be resumed by replacing the changed block in a backup set, 4) faster restore by restoring only modified blocks, 5) reduced failures due to network problems, 6) job failures may be addressed by fixing issues itself, 7) faster backup and dynamic compression may be performed, 8) logs may be cleared before backup to reduce data size, 9) connecting to the cloud and applying this BDR solution there, 10) pushing backups to cloud storage after backup archival verification, and 11) viewing issues in a web-based dashboard, receiving alerts, and creating reports.

Figure 1B:
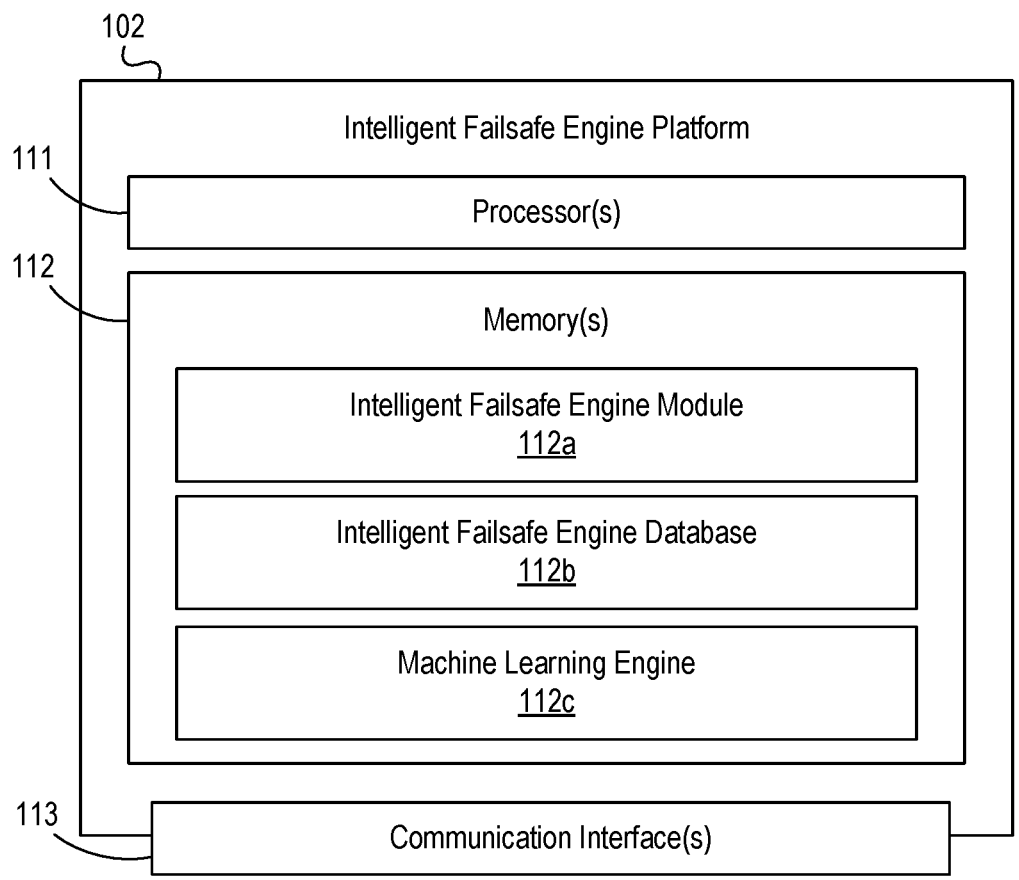

FIGS. 1A-1B depict an illustrative computing environment for an intelligent failsafe engine in accordance with one or more example embodiments. Referring to FIG. 1A, computing environment 100 may include one or more computer systems. For example, computing environment 100 may include an intelligent failsafe engine host platform 102, data storage system 103, and user device 104.

As described further below, intelligent failsafe engine host platform 102 may be a computer system that includes one or more computing devices (e.g., servers, server blades, or the like) and/or other computer components (e.g., processors, memories, communication interfaces) that may implement an intelligent failsafe engine to perform advanced data restore techniques. In some instances, the intelligent failsafe engine host platform 102 may be a locally based or cloud based computing platform.

Data storage system 103 may include one or more computing devices (e.g., servers, server blades, or the like) and/or other computer components (e.g., processors, memories, communication interfaces) that may be used to process and/or store data for an individual and/or an enterprise organization (e.g., a financial institution).

User device 104 may be a laptop computer, desktop computer, mobile device, tablet, smartphone, or the like that may be used by an employee of an enterprise organization (e.g., a financial institution, or the like). For example, the user device 104 may be used by a system administrator to monitor network health and/or data security. In some instances, user device 104 may be configured to display one or more user interfaces (e.g., data management interfaces, and/or other interfaces).

Computing environment 100 also may include one or more networks, which may interconnect intelligent failsafe engine host platform 102, data storage system 103, and/or user device 104. For example, computing environment 100 may include a network 101 (which may interconnect, e.g., intelligent failsafe engine host platform 102, data storage system 103, and/or user device 104).

In one or more arrangements, intelligent failsafe engine host platform 102, data storage system 103, and/or user device 104 may be any type of computing device capable of sending and/or receiving requests and processing the requests accordingly. For example, intelligent failsafe engine host platform 102, data storage system 103, user device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of intelligent failsafe engine host platform 102, data storage system 103, and/or user device 104, may, in some instances, be special-purpose computing devices configured to perform specific functions.

Referring to FIG. 1B, intelligent failsafe engine host platform 102 may include one or more processors 111, memory 112, and communication interface 113. A data bus may interconnect processor 111, memory 112, and communication interface 113. Communication interface 113 may be a network interface configured to support communication between intelligent failsafe engine host platform 102 and one or more networks (e.g., network 101, or the like). Memory 112 may include one or more program modules having instructions that when executed by processor 111 cause intelligent failsafe engine host platform 102 to perform one or more functions described herein and/or one or more databases that may store and/or otherwise maintain information which may be used by such program modules and/or processor 111. In some instances, the one or more program modules and/or databases may be stored by and/or maintained in different memory units of intelligent failsafe engine host platform 102 and/or by different computing devices that may form and/or otherwise make up intelligent failsafe engine host platform 102. For example, memory 112 may have, host, store, and/or include intelligent failsafe engine module 112a, intelligent failsafe engine database 112b, and machine learning engine 112c.

Intelligent failsafe engine module 112a may have instructions that direct and/or cause intelligent failsafe engine platform 102 to execute advanced data backup techniques. Intelligent failsafe engine database 112b may store information used by intelligent failsafe engine module 112a and/or intelligent failsafe engine platform 102 in application of data backup techniques, and/or in performing other functions. Machine learning engine 112c may have instructions that direct and/or cause the intelligent failsafe engine platform 102 to set, define, and/or iteratively refine optimization rules and/or other parameters used by the intelligent failsafe engine platform 102 and/or other systems in computing environment 100.

Figure 2B:
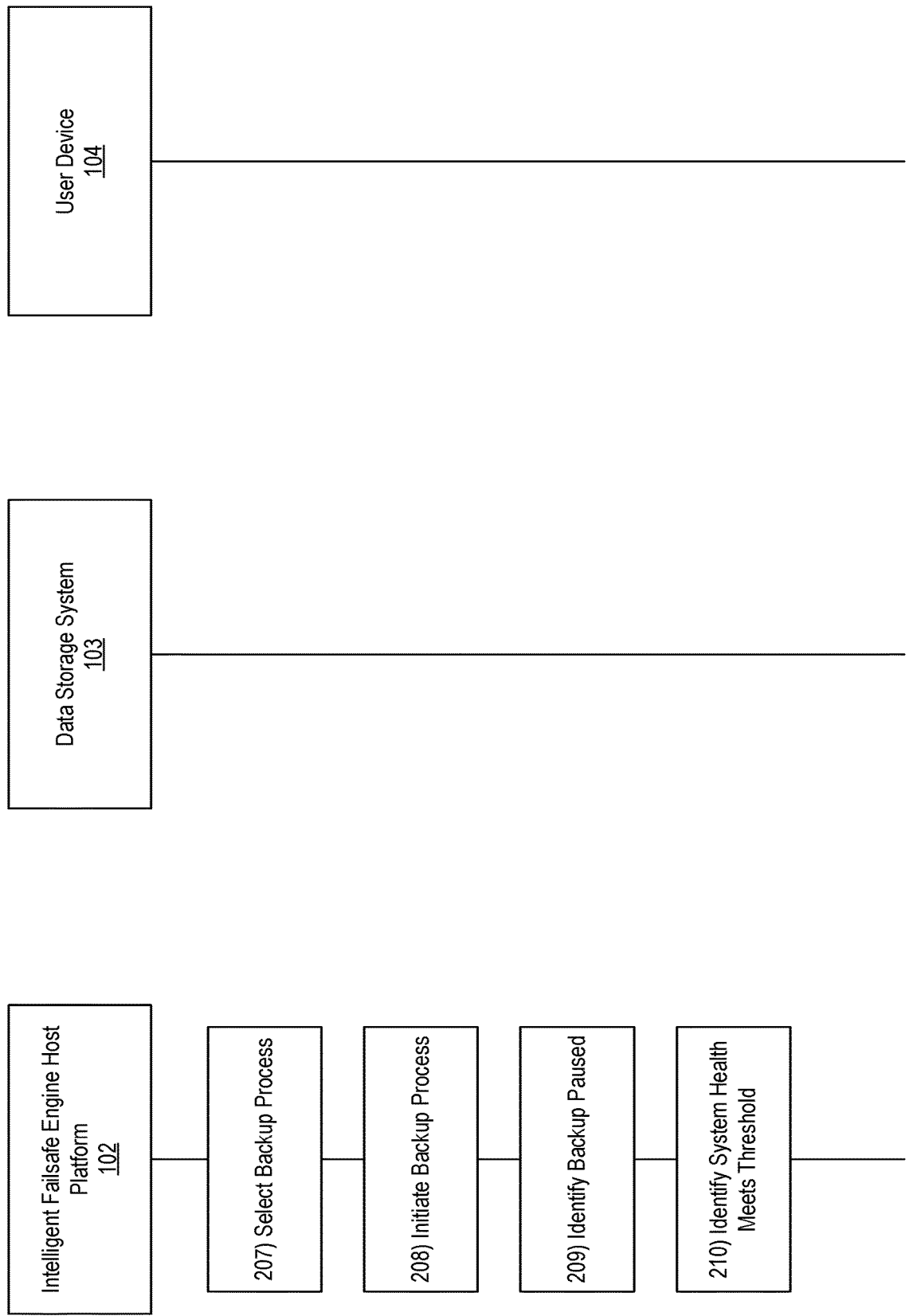

FIGS. 2A-2D depict an illustrative event sequence for an intelligent failsafe engine in accordance with one or more example embodiments. Referring to FIG. 2A, at step 201, the intelligent failsafe engine host platform 102 may establish a connection with the data storage system 103. For example, the intelligent failsafe engine host platform 102 may establish a first wireless data connection with the data storage system 103 to link the intelligent failsafe engine host platform 102 with the data storage system 103. In some instances, the intelligent failsafe engine host platform 102 may identify whether a connection is already established with the data storage system 103. If a connection is already established with the data storage system 103, the intelligent failsafe engine host platform 102 might not re-establish the connection. If a connection is not yet established with the data storage system 103, the intelligent failsafe engine host platform 102 may establish the first wireless data connection as described herein.

At step 202, the intelligent failsafe engine host platform 102 may send a request for historical data to the data storage system 103. For example, the intelligent failsafe engine host platform 102 may send the request for historical data to the data storage system 103 via the communication interface 113 and while the first wireless data connection is established.

At step 203, the data storage system 103 may receive the request for historical data sent at step 202. For example, the data storage system 103 may receive the request for historical data while the first wireless data connection is established.

At step 204, the data storage system 103 may send historical data to the intelligent failsafe engine host platform 102. For example, in sending the historical data, the data storage system 103 may send historical data logs, resource utilization information, work-load data, modified data block statistics/signatures, system state information, intelligent failsafe engine tasks, and/or other historical data. In some instances, in sending the historical data, the data storage system 103 may send the historical data to the intelligent failsafe engine host platform 102 while the first wireless data connection is established.

At step 205, the intelligent failsafe engine host platform 102 may receive the historical data sent at step 204. For example, the intelligent failsafe engine host platform 102 may receive the historical data via the communication interface 113 and while the first wireless data connection is established.

At step 206, the intelligent failsafe engine host platform 102 may identify a best suitable window for a database backup (e.g., a duration of the database backup). For example, the intelligent failsafe engine host platform 102 may identify a database backup window that produces the most accurate results and/or results in minimal error. For example, the intelligent failsafe engine host platform 102 may input the historical data into a machine learning model, which may output the best suitable window. More specifically, the intelligent failsafe engine host platform 102 may identify, for each of a plurality of database backup windows, a number of errors occurring in a plurality of historical data backups, and may select the database backup window with the smallest number of errors. As a particular example, the intelligent failsafe engine host platform 102 may identify that the best suitable window is one week.

Additionally or alternatively, the intelligent failsafe engine host platform 102 may use one or more machine learning algorithms to analyze and/or categorize the historical data (e.g., based on work load and/or resource utilization). In these instances, the intelligent failsafe engine host platform 102 may identify a current work load and/or resource utilization, and identify corresponding work load/resource utilization information in the historical data. In these instances, the intelligent failsafe engine host platform 102 may identify a duration of a database backup window corresponding to the matching work load/resource utilization information from the historical data.

Referring to FIG. 2B, at step 207, the intelligent failsafe engine host platform 102 may select a backup process. For example, the intelligent failsafe engine host platform 102 may identify whether to apply a full backup process or a differential backup process. In a similar method to that described above at step 206 with regard to identification of the best suitable window, the intelligent failsafe engine host platform 102 may use one or more machine learning algorithms to identify historical data that corresponds to current work load and/or resource location, and may identify, using the historical data, a type of backup process that was previously applied under those conditions. Additionally or alternatively, the intelligent failsafe engine host platform 102 may select a differential backup process until identifying that all target blocks (or a threshold number of target blocks) have been modified, and then may select a full backup process, and reset that process (e.g., after selecting the full backup, all target blocks may be treated as being unmodified until they are modified again).

At step 208, the intelligent failsafe engine host platform 102 may initiate the backup process selected at step 207. For example, in instances where the intelligent failsafe engine host platform 102 selects a full backup process to be performed, the intelligent failsafe engine host platform 102 may initiate a backup process that includes updating all of a plurality of target data blocks during the best suitable window. However, in these instances, the intelligent failsafe engine host 102 may update/backup only data blocks that have been modified since a previous backup (e.g., as indicated in block information accessible by the intelligent failsafe engine host platform 102). For example, the intelligent failsafe engine host platform 102 may perform a backup on data blocks 1-5 in a single day, and may only back up data blocks 2 and 4 (assuming they are the only blocks that have changed since a previous backup).

In instances where the intelligent failsafe engine host platform 102 selects a differential backup process, the intelligent failsafe engine host platform 102 may update a subset of the plurality of target data blocks during a first best suitable window (e.g., a first interval), a second subset of the plurality of target data blocks during a second best suitable window (e.g., a second interval), and so on. As described above with regard to the full data backup, in instances where the intelligent failsafe engine host platform 102 initiates the differential backup process, the intelligent failsafe engine host platform may update/backup only data blocks that have been modified since a previous backup. For example, the intelligent failsafe engine host platform 102 may perform a backup on block 2 on a first day and block 4 on a second day (assuming they are the only blocks that have changed since a previous backup).

At step 209, the intelligent failsafe engine host platform 102 may identify that the backup process, initiated at step 208, has paused, failed, or otherwise stopped. For example, the intelligent failsafe engine host platform 102 may identify that a particular block has been corrupted or otherwise maliciously modified, and thus may temporarily stop the backup process at this particular block. Additionally or alternatively, the intelligent failsafe engine host platform 102 may identify that system and/or network health has fallen below a system threshold level, and may have paused the backup process accordingly.

At step 210, the intelligent failsafe engine host platform 102 may identify that the system/network health of the intelligent failsafe engine host platform 102 now exceeds the system threshold level. For example, after pausing the backup, the intelligent failsafe engine host platform 102 may keep the backup paused until the system threshold level is exceeded. If the intelligent failsafe engine host platform 102 determines that the system threshold level is not exceeded, the intelligent failsafe engine host platform 102 might not move on to step 211 (and instead may wait until the system threshold level is exceeded). If the intelligent failsafe engine host platform 102 determines that the system threshold level is exceeded, the intelligent failsafe engine host platform 102 may proceed to step 211.

Referring to FIG. 2C, at step 211, after determining that the system threshold level is exceeded at step 210, the intelligent failsafe engine host platform 102 may resume the backup process that was previously paused. In doing so, rather than re-initiating the backup process from an initial data block (e.g., the first data block that was backed up at step 208), the intelligent failsafe engine host platform 102 may resume the backup at the particular block at which the backup was paused at step 209. In doing so, the intelligent failsafe engine host platform 102 may conserve computing resources by not duplicating attempts to backup blocks that have already been successfully backed up (e.g., before the backup was paused), and similarly may increase efficiency of the backup process (e.g., it may take less time to resume backup at the particular block rather than to restart the backup process in its entirety).

At step 212, the backup process may be completed, and the intelligent failsafe engine host platform 102 may generate a backup file (e.g., which may include backup information). The intelligent failsafe engine host platform 102 may compress and store the backup file (e.g., in memory, on the cloud, and/or elsewhere). By compressing the backup file before storing it, the intelligent failsafe engine host platform 102 may conserve memory and/or cloud storage resources.

At step 213, the intelligent failsafe engine host platform 102 may generate data health information, based on the backup process and/or the backup file, which may indicate the particular block (or blocks) at which the backup process was paused (and thus may be compromised, maliciously modified, and/or otherwise be indicative of a security threat). In some instances, the intelligent failsafe engine host platform 102 may also generate one or more commands directing the user device 104 to display the data health information.

At step 214, the intelligent failsafe engine host platform 102 may train and/or otherwise update a machine learning model that was used to identify the suitable window at step 206. For example, if the intelligent failsafe engine host platform 102 identified that the backup process was paused during the suitable window, the intelligent failsafe engine host platform 102 may determine that the suitable window should be decreased (and thus may cause a data point to be added to the model and/or otherwise refine the model to reduce the suitable window). If the intelligent failsafe engine host platform 102 identified that the backup process was not paused during the suitable window, the intelligent failsafe engine host platform 102 may determine that the suitable window may be increased (or otherwise re-enforce the model by indicating that the suitable window should remain the same).

Figure 2D:
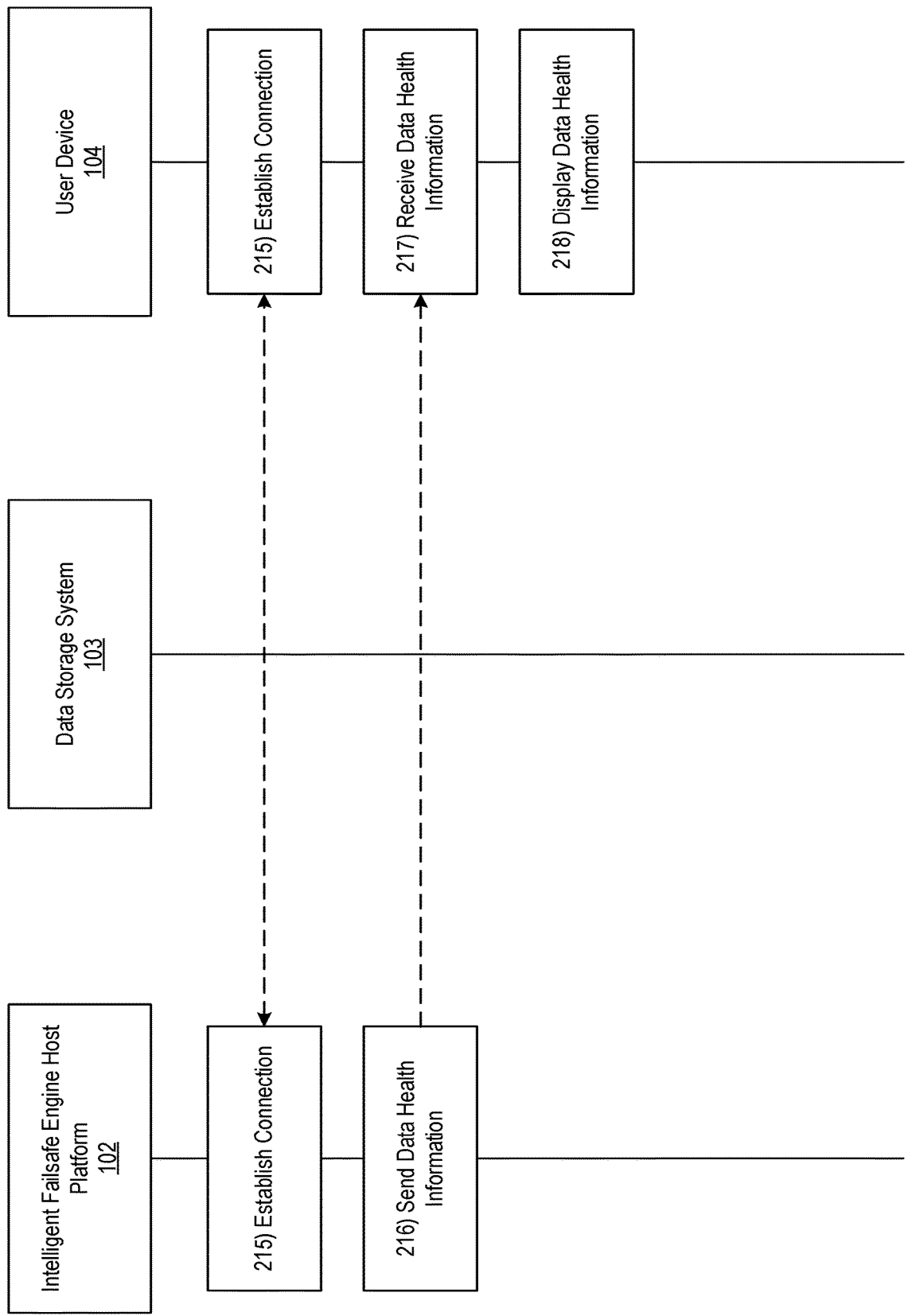

Referring to FIG. 2D, at step 215, the intelligent failsafe engine host platform 102 may establish a connection with the user device 104. For example, the intelligent failsafe engine host platform 102 may establish a second wireless data connection with the user device 104 to link the intelligent failsafe engine host platform 102 to the user device 104 (e.g., in preparation for sending data health information). In some instances, the intelligent failsafe engine host platform 102 may identify whether or not a connection is already established with the user device 104. If a connection is already established with the user device 104, the intelligent failsafe engine host platform 102 might not re-establish the connection. If a connection is not yet established with the user device 104, the intelligent failsafe engine host platform 102 may establish the second wireless data connection as described herein.

At step 216, the intelligent failsafe engine host platform 102 may send the data health information to the user device 104. For example, the intelligent failsafe engine host platform 102 may send the data health information to the user device 104 via the communication interface 113 and while the second wireless data connection is established. In some instances, along with the data health information, the intelligent failsafe engine host platform 102 may send the one or more commands directing the user device 104 to display the data health information.

At step 217, the user device 104 may receive the data health information sent at step 217. For example, the user device 104 may receive the data health information while the second wireless data connection is established. In some instances, the user device 104 may also receive the one or more commands directing the user device 104 to display the data health information.

Figure 4:
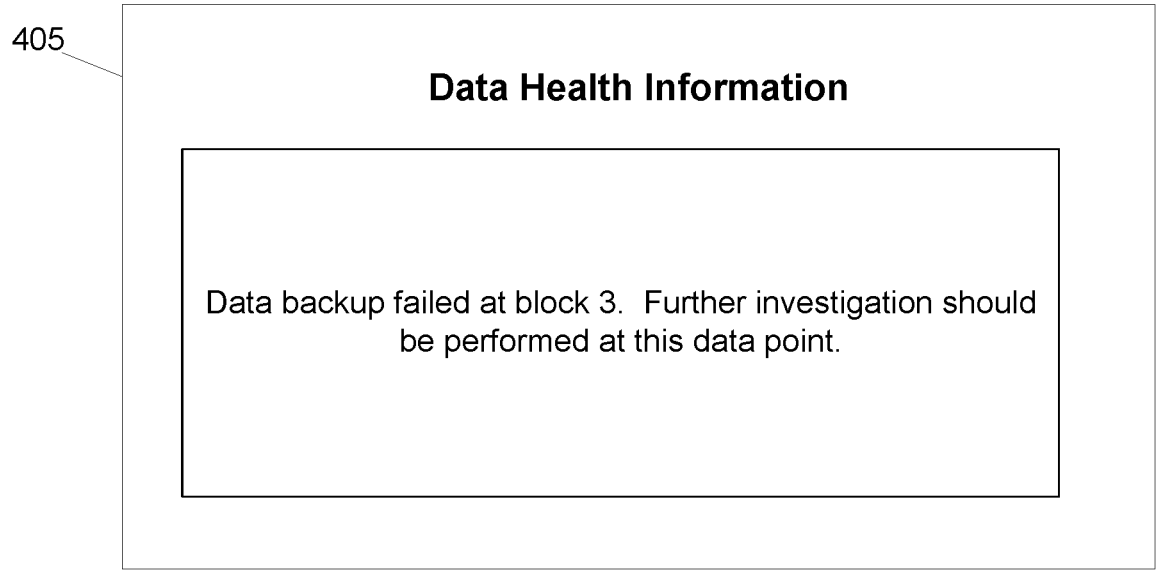
FIG. 4 depicts an illustrative graphical user interface for an intelligent failsafe engine in accordance with one or more example embodiments.

At step 218, based on or in response to the one or more commands directing the user device 104 to display the data health, the user device 104 may display the data health information. For example the user device 104 may display a graphical user interface similar to graphical user interface 405, which is shown in FIG. 4. For example, the user device 104 may display information indicating one or more data blocks at which the backup process was paused, and thus may be compromised.

Figure 3:
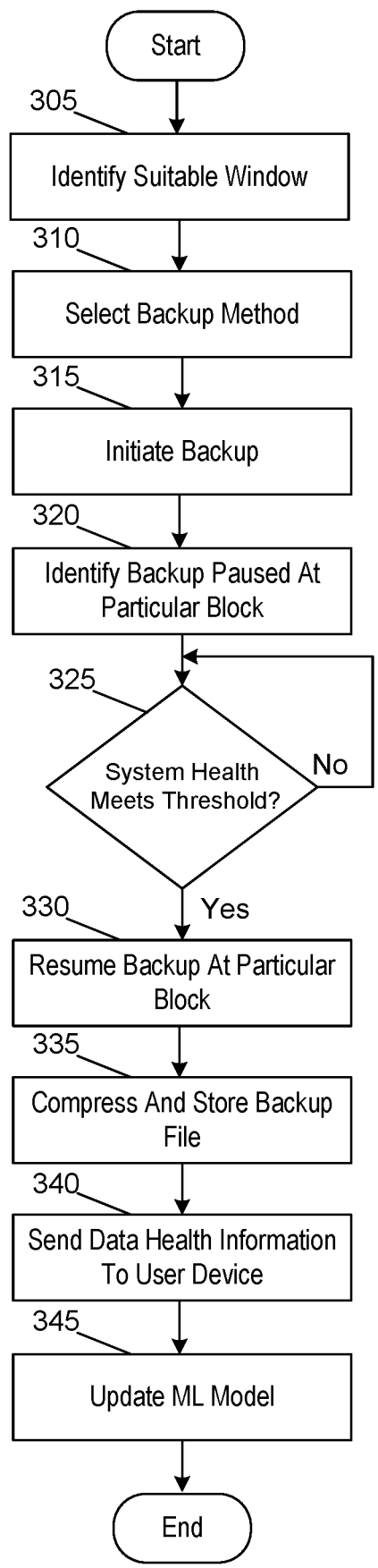
FIG. 3 depicts an illustrative method for an intelligent failsafe engine in accordance with one or more example embodiments.

FIG. 3 depicts an illustrative method for an intelligent failsafe engine in accordance with one or more example embodiments. Referring to FIG. 3, at step 305, a computing platform having at least one processor, a communication interface, and memory may identify a suitable window for database backup. At step 310, the computing platform may select one of a full or differential backup method. At step 315, the computing platform may initiate the selected backup method. At step 320, the computing platform may identify that the backup paused at a particular data block. At step 325, the computing platform may identify whether or not system health meets a system threshold. The computing platform may proceed to step 330 after identifying that the system threshold is met. At step 330, the computing platform may resume backup at the particular data block. At step 335, the computing platform may compress and store a backup file corresponding to the backup process. At step 340, the computing platform may send data health information to a user device for display. At step 345, the computing platform may update/refine a machine learning model used to select the suitable window.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the processor, cause the computing platform to:
   identify, using historical data and one or more machine learning algorithms, a time window during which to perform a database backup;
   determine that a first backup should be initiated that corresponds to the time window;
   perform a differential backup, wherein performing the differential backup comprises backing up a first subset of a plurality of data blocks during a first interval of the time window and backing up a second subset of the plurality of data blocks during a second interval of the time window, different than the first interval, wherein performing the differential backup comprises backing up blocks that have been modified since a previous backup or interval by identifying blocks with signatures indicating modifications in both the first and second subset of plurality of data blocks;
   identify that the first backup has paused at a particular data block;
   identify that the first backup should be resumed;
   resume the first backup at the particular data block; and
   send data health information and one or more commands directing a user device to display the data health information, wherein sending the data health information and the one or more commands directing the user device to display the data health information causes the user device to display the data health information.

2. The computing platform of claim 1, wherein the memory stores additional computer-readable instructions that, when executed by the at least one processor, cause the computing platform to:
   perform a second backup, wherein performing the second backup comprises selecting a backup method from one of: a full backup or the differential backup, and initiating the selected backup method.

3. The computing platform of claim 2, wherein selecting the backup method comprises selecting, based on historical data, the backup method.

4. The computing platform of claim 1, wherein the memory stores additional computer-readable instructions that, when executed by the at least one processor, cause the computing platform to:
   complete the first backup, wherein completion of the first backup results in backup information;
   compress the backup information; and
   store the compressed backup information.

5. The computing platform of claim 1, wherein the data health information indicates the particular data block.

6. The computing platform of claim 1, wherein the computing platform is a cloud based system.

7. The computing platform of claim 1, wherein the memory stores additional computer-readable instructions that, when executed by the at least one processor, cause the computing platform to:
   update, using the data health information, the one or more machine learning algorithms.

8. A method comprising:
   at a computing platform comprising at least one processor, a communication interface, and memory:
   identifying, using historical data and one or more machine learning algorithms, a time window during which to perform a database backup;
   determining that a first backup should be initiated that corresponds to the time window;
   performing a differential backup, wherein performing the differential backup comprises backing up a first subset of a plurality of data blocks during a first interval of the time window and backing up a second subset of the plurality of data blocks during a second interval of the time window, different than the first interval, wherein performing the backup comprises backing up blocks that have been modified since a previous backup or interval by identifying blocks with signatures indicating modifications in both the first and second subset of plurality of data blocks;

identifying that the first backup has paused at a particular data block;

identifying that the first backup should be resumed;

resuming the first backup at the particular data block; and sending data health information and one or more commands directing a user device to display the data health information, wherein sending the data health information and the one or more commands directing the user device to display the data health information causes the user device to display the data health information.

9. The method of claim 8, wherein the memory stores additional computer-readable instructions that, when executed by the at least one processor, cause the computing platform to:

perform a second backup, wherein performing the second backup comprises selecting a backup method from one of: a full backup or a differential backup, and initiating the selected backup method.

10. The method of claim 9, wherein selecting the backup method comprises selecting, based on historical data, the backup method.

11. The method of claim 8, wherein the memory stores additional computer-readable instructions that, when executed by the at least one processor, cause the computing platform to:

complete the first backup, wherein completion of the first backup results in backup information;

compress the backup information; and store the compressed backup information.

12. The method of claim 8, wherein the data health information indicates the particular data block.

13. The method of claim 8, wherein the computing platform is a cloud based system.

14. The method of claim 8, wherein the memory stores additional computer-readable instructions that, when executed by the at least one processor, cause the computing platform to:

update, using the data health information, the one or more machine learning algorithms.

15. One or more non-transitory computer-readable media storing instructions that, when executed by a computing platform comprising at least one processor, a communication interface, and memory, cause the computing platform to:

identify, using historical data and one or more machine learning algorithms, a time window during which to perform a database backup;

determine that a first backup should be initiated that corresponds to the time window;

perform a differential backup, wherein performing the differential backup comprises backing up a first subset of a plurality of data blocks during a first interval of the time window and backing up a second subset of the plurality of data blocks during a second interval of the time window, different than the first interval, wherein performing the backup comprises backing up blocks that have been modified since a previous backup or interval by identifying blocks with signatures indicating modifications in both the first and second subset of plurality of data blocks;

identify that the first backup has paused at a particular data block;

identify that the first backup should be resumed;

resume the first backup at the particular data block; and send data health information and one or more commands directing a user device to display the data health information, wherein sending the data health information and the one or more commands directing the user device to display the data health information causes the user device to display the data health information.

16. The one or more non-transitory computer-readable media of claim 15, wherein identifying that the first backup has paused is based on identifying that a system health of the computing platform has fallen below a system threshold level.

17. The computing platform of claim 1, wherein identifying that the first backup has paused is responsive to identifying that a system health of the computing platform has fallen below a system threshold level.

18. The computing platform of claim 17, wherein identifying that the first backup should be resumed is responsive to identifying that the system health of the computing platform meets or exceeds the system threshold level.

19. The method of claim 8, wherein identifying that the first backup has paused is responsive to identifying that a system health of the computing platform has fallen below a system threshold level.

20. The method of claim 19, wherein identifying that the first backup should be resumed is responsive to identifying that the system health of the computing platform has exceeded a system threshold.

* * * * *